(12) United States Patent
Li

(10) Patent No.: US 12,714,086 B2
(45) Date of Patent: Aug. 25, 2026

(54) PORTABLE MOSQUITO REPELLENT DEVICE

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 158 days.

(21) Appl. No.: 18/737,135

(22) Filed: Jun. 7, 2024

(65) Prior Publication Data

US 2024/0423195 A1 Dec. 26, 2024

(30) Foreign Application Priority Data

Jun. 20, 2023 (CN) ......................... 202310740737.6

(51) Int. Cl.

| | |
|---|---|
| ***A01N 25/18*** | (2006.01) |
| ***A01M 1/20*** | (2006.01) |
| ***A01M 29/12*** | (2011.01) |
| ***A01N 35/02*** | (2006.01) |
| ***A01N 53/00*** | (2006.01) |
| ***A01P 7/04*** | (2006.01) |
| ***A01P 17/00*** | (2006.01) |

(52) U.S. Cl.
CPC ........ *A01M 1/2061* (2013.01); *A01M 1/2022* (2013.01); *A01M 29/12* (2013.01); *A01N 25/18* (2013.01); *A01N 35/02* (2013.01); *A01N 53/00* (2013.01); *A01P 7/04* (2021.08); *A01P 17/00* (2021.08); *A01M 2200/012* (2013.01)

(58) Field of Classification Search
CPC .............. A01M 1/2061; A01M 1/2022; A01M 2200/012; A01M 29/12; A01P 7/04; A01P 17/00; A01N 25/18; A01N 35/02; A01N 53/00
See application file for complete search history.

(56) References Cited

U.S. PATENT DOCUMENTS

| | | | | |
|---|---|---|---|---|
| 2015/0133406 | A1* | 5/2015 | Bedoukian ............. | A01N 49/00 514/159 |
| 2022/0361485 | A1* | 11/2022 | Ressler .................. | A01N 37/36 |

FOREIGN PATENT DOCUMENTS

| | | | | |
|---|---|---|---|---|
| CN | 111264552 A | * | 6/2020 | ............... C09K 5/18 |
| CN | 211153518 U | * | 8/2020 | |
| CN | 108184831 B | | 9/2020 | |

* cited by examiner

*Primary Examiner* — Steven M Sutherland

(57) ABSTRACT

A portable mosquito repellent device comprises a container and a cover body, wherein an upper portion of the container is provided with an opening, the cover body is configured to seal and cover the opening, the container contained a heating body, a composition of the heating body includes reduced iron powder, and a heating temperature of the heating body is 40° C.-120° C., the heating body is provided with a tablet for loading the repellent agent, the repellent agent includes Picaridin. The working temperature is relatively low, no heating device is required, the volume is small, and it is more convenient to carry. Moreover, the cover body of the present disclosure can be opened to start working without spraying or applying to the skin, making it safer to use.

6 Claims, 2 Drawing Sheets

PORTABLE MOSQUITO REPELLENT DEVICE

TECHNICAL FIELD

The present disclosure relates to the field of mosquito control technology, specifically portable mosquito repellent device.

BACKGROUND

Mosquito control is one of the issues that cannot be ignored in daily life. In outdoor activities, due to the large number of mosquitoes and the lack of power supply equipment, there is a great market demand for portable mosquito repellent methods that do not require electricity. The most common portable mosquito repellent means in the existing technology are mosquito repellent spray, electric mosquito repellent incense with battery and self-heating mosquito repellent incense, wherein the self-heating mosquito repellent incense and mosquito repellent spray are convenient to use and more suitable for carrying out.

In the existing technology, the patent document with US201711460863.7 discloses a reusable portable self-heating mosquito repellent, which uses a self-heating body to react with air to heat the drug and diffuse it into the environment. However, the drug used is pyrethroid, which works at a high temperature, making it difficult to lightweight the heater volume and insufficient portability.

SUMMARY

The present disclosure provides a portable mosquito repellent device to solve the problem of high temperature requirements for self-heating mosquito repellent incense in prior art, making it difficult to lightweight the heater volume and insufficient portability.

In order to achieve the above objectives, the present disclosure adopts the following technical solutions.

A portable mosquito repellent device, comprising a container and a cover body, wherein

- an upper portion of the container is provided with an opening,
- the cover body is configured to seal and cover the opening,
- the container contained a heating body and repellent agent in thermal contact with the heating body,
- wherein the repellent agent is loaded onto a tablet, the tablet is arranged on the heating body, or, the repellent agent is mixed with the heating body to form a heating body mixture, a composition of the heating body includes reduced iron powder, and a heating temperature of the heating body is 40° C.-120° C.,
- the repellent agent includes Picaridin.

Furthermore, the repellent agent also includes one or more of mosquito repellent ester, methyl nonyl ketone, and mosquito repellent amine.

Furthermore, the container is provided with a layer of polymer mesh with a porous structure, the polymer mesh is configured to prevent the heating body and the tablet from leaking out of the container, and preparation material of the polymer mesh includes one or more of PET, PP, PTFE, and e-PTFE.

Furthermore, an outer periphery side of the container is uniformly distributed with three or more hooks.

Furthermore, the cover body covers the opening at one time by hot pressing or thermoplastic means.

Furthermore, a preparation method of the heating body mixture comprises:

- dissolving the repellent agent in an organic solvent to prepare a repellent solution;
- adding β-cyclodextrin powder to distilled water to prepare a saturated solution of β-cyclodextrin;
- mixing the repellent solution with the saturated solution of β-cyclodextrin and filter to obtain a filter cake;
- dispersing the filter cake into a powder-shaped inclusion complex of the β-cyclodextrin and the repellent agent; and
- mixing the inclusion complex of the β-cyclodextrin and the repellent agent with the heating body to form the heating body mixture.

Furthermore, the organic solvent is anhydrous ethanol, acetone, or a mixture thereof.

The beneficial effects of the present disclosure are:

1. The working temperature is relatively low, no heating device is required, the volume is small, and it is more convenient to carry.
2. It can start working by opening the cover body, without the need to spray or apply it to the skin, making it safer to use.

REFERENCE SIGNS

Figure 1:
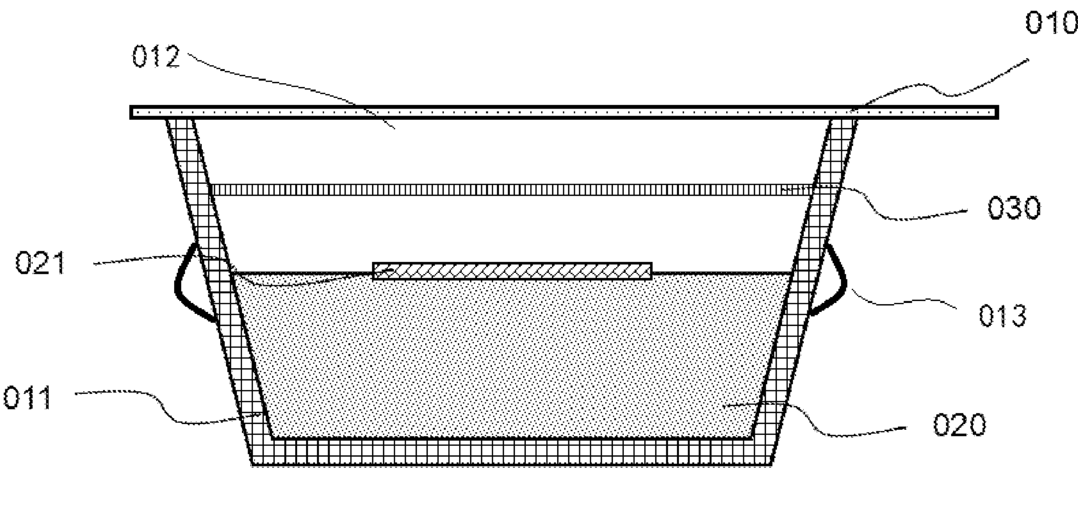
FIG. 1 is a longitudinal cross-sectional view of a first embodiment of a portable mosquito repellent device.

010: cover body; 011: container; 012: opening; 013: hook; 020: heating body; 021: tablet; 022: heating body mixture; 030: polymer mesh.

DETAILED DESCRIPTION

In order to make the purpose, technical solution, and advantages of the present disclosure clearer, the following will provide a further clear and complete description of the technical solution of the present disclosure in conjunction with the embodiments of the present disclosure. It should be noted that the described embodiments are only a portion of the embodiments of the present disclosure, not all of them. Based on the embodiments in the present disclosure, all other embodiments obtained by ordinary technicians in the art without creative labor fall within the scope of protection of the present disclosure.

It should be noted that if there are directional indications (such as up, down, left, right, front, back, top, bottom, inside, outside, vertical, horizontal, counterclockwise, clockwise, circumferential, radial, axial, etc.) involved in the embodiments of the present disclosure, the directional indication is only used to explain the relative position relationship and motion situation between components in a specific posture (as shown in the attached figures). If the specific posture changes, the directional indication also changes accordingly.

In the embodiments of the present disclosure, the term "and/or" is only a description of the association relationship of the associated object, indicating that there can be three types of relationships, such as, A and/or B can represent the presence of A alone, the presence of A and B simultaneously, and the presence of B alone.

The terms "first" and "second" in the embodiments of the present disclosure are only used to describe the purpose and cannot be understood as indicating or implying relative importance or implying the quantity of the indicated technical features. Therefore, the features limited to "first" and "second" can explicitly or implicitly include at least one of these features. In the description of the present disclosure, the terms "including" and "having" and any variations thereof are intended to cover nonexclusive inclusion. For example, a system, product, or device that includes a series of components or units is not limited to the listed components or units, but optionally also includes unlisted components or units, or optionally includes other components or units inherent to these products or devices. In the description of the present disclosure, "multiple" means at least two, such as two, three, etc., unless otherwise specified.

Referring to "embodiment" in the present disclosure means that specific features, structures, or features described in conjunction with the embodiments may be included in at least one embodiment of the present disclosure. The phrase appearing in various positions in the specification does not necessarily refer to the same embodiment, nor is it an independent or alternative embodiment that is mutually exclusive with other embodiments. Those skilled in the art explicitly and implicitly understand that the embodiments described in this article can be combined with other embodiments.

Figure 2:
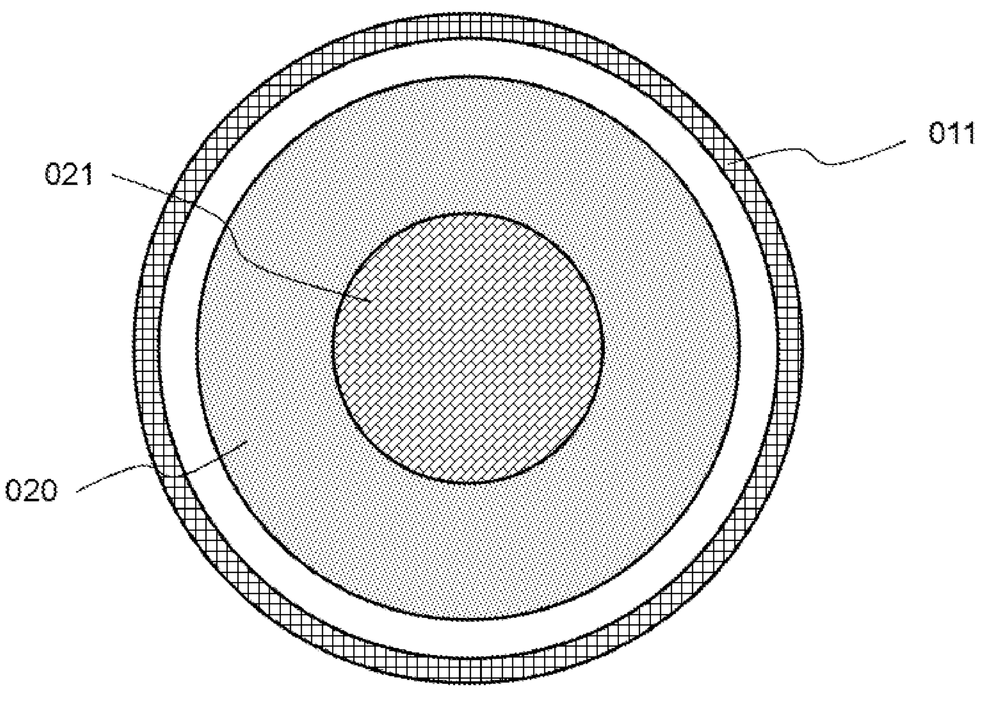
FIG. 2 is a cross-sectional view of a first embodiment of a portable mosquito repellent device.

The present disclosure provides a portable mosquito repellent device, as shown in FIGS. 1 and 2, comprising a container 011, a heating body 020 contained within the container 011, a tablet 021 provided on the heating body 020, and a cover body 010 covering the upper opening 12 of the container 011. Wherein, the inner portion of the container 011 is provided with a layer of polymer mesh 030 above the tablet 021, which is used to prevent the contents of the container (heating body and tablet 021) from leaking while passing through the volatile medicine. The materials of polymer mesh include one or more of PET (polyethylene terephthalate), PP (polypropylene), PTFE (poly tetra fluoroethylene) and e-PTFE (expanded PTFE).

The cover body 010 of the present disclosure is sealed and arranged on the container 011 at one time, and the sealing method includes hot pressing and thermoplastic.

Considering toxicity and temperature, the present disclosure uses insecticides that have a mosquito repellent effect rather than a killing effect, such as Picaridin, mosquito repellent ester, methyl nonyl ketone, and mosquito repellent amine. The aforementioned insecticides are liquid at room temperature and can be adsorbed on hydrophilic materials in the form of sheets, resulting in the production of tablet 021.

The heating body in the present disclosure is made of materials such as reduced iron powder, absorbent resin, water, carbon powder, vermiculite, and sodium chloride. The absorbent resin is first placed in a sodium chloride solution to fully absorb water, and then an expanded absorbent resin is obtained. Mix the expanded water absorbing resin, reduced iron powder, carbon powder, and vermiculite thoroughly and evenly to obtain a heating body. When the heating body comes into contact with air, the reduced iron powder reacts with the air, generating heat and causing the temperature of the heating element to rise. By adjusting the specific ratio of the aforementioned materials, the working temperature range of the heating body can be adjusted.

In an example ratio, the reduced iron powder is 40%-60%, the absorbent resin is 4%-12%, the water is 20%-30%, the carbon powder is 2%-6%, the vermiculite is 1%-3%, the sodium chloride is 2%-5%, the working temperature range for stable heating of the heating body under this ratio is 65° C.-90° C.

Figure 3:
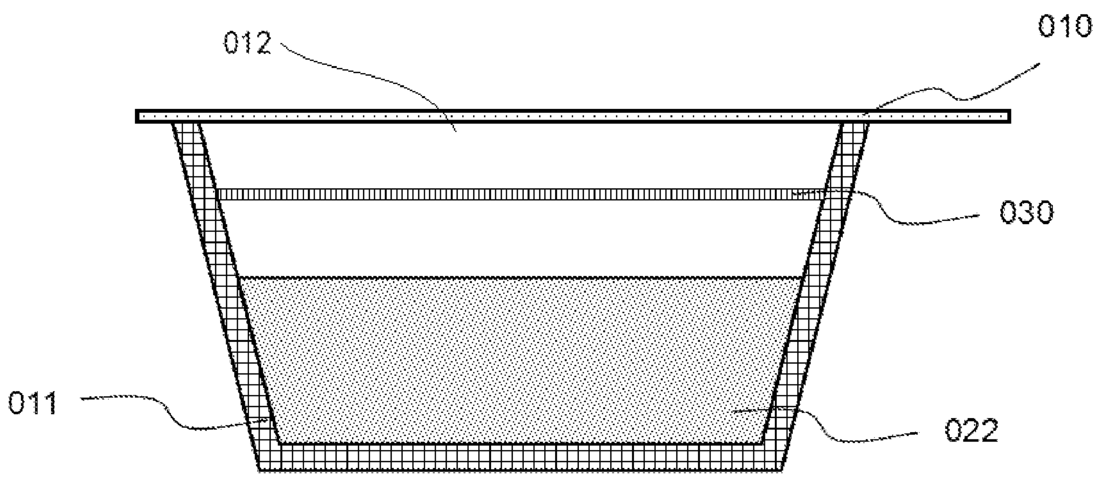
FIG. 3 is a longitudinal cross-sectional view of a second embodiment of a portable mosquito repellent device.
Figure 4:
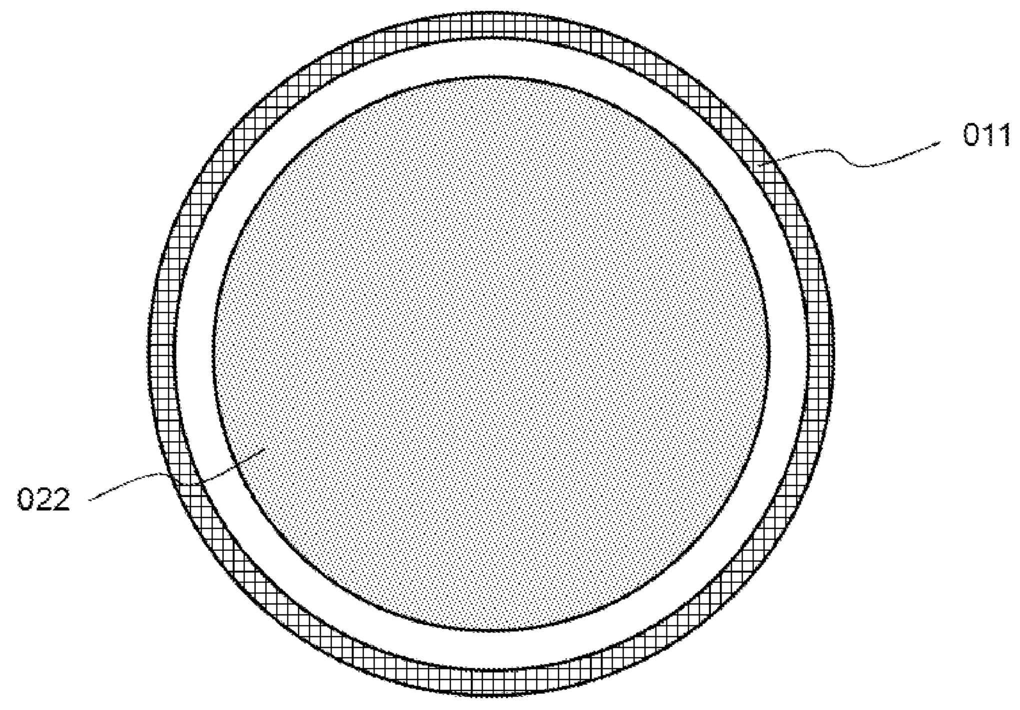
FIG. 4 is a cross-sectional view of a second embodiment of a portable mosquito repellent device.

As shown in FIGS. 3 and 4, in another embodiment of the present disclosure, there is no tablet 021 for loading repellent agent, and the drug is directly mixed with a heating body to form a heating body mixture 022, replacing the heating body 020 in the previous embodiment. The preparation process of the heating body mixture 022 is as follows.

Step 1:

As mentioned above, place the absorbent resin into a sodium chloride solution and fully absorb water to obtain an expanded absorbent resin. Mix the expanded absorbent resin, reduced iron powder, carbon powder, and vermiculite thoroughly and evenly to obtain a heating body.

Step 2:

Repellent agents (mainly Picaridin, which can further include one or more of mosquito repellent ester, methyl nonyl ketone, and mosquito repellent amine) are dissolved in organic solvents (anhydrous ethanol, acetone, or a mixture thereof) to produce a repellent solution.

Step 3:

The β-cyclodextrin powder, which is 5 times the weight of repellent solution, is added into an appropriate amount of distilled water in batches and stirred to prepare a β-cyclodextrin saturated solution, which is kept at 40-50° C. for later use.

Step 4:

Under conditions of avoiding ultraviolet light and 40-50° C., drop the above-mentioned repellent solution into β-cyclodextrin saturated solution, stir continuously, cool and transfer to 4° C. for standing, and filter to obtain a filter cake.

Step 5:

Stir and disperse the filter cake, and dry it with air at 40° C. for 1-3 hours to obtain a powder-shaped β-cyclodextrin repellent inclusion complex.

Step 6:

The above powder-shaped β-cyclodextrin repellent inclusion complex is mixed with the heating body to produce a heating body mixture 022.

As shown in FIG. 1, considering the outdoor environment, the portable mosquito repellent device of the present disclosure may not necessarily have a suitable placement and use position. Therefore, on the outer periphery side of the container 011, more than three hooks 013 can be uniformly distributed for use with hanging ropes.

The above embodiments only express the embodiments of the present disclosure, and their description is more specific and detailed. However, it cannot be understood as a limitation on the scope of the present disclosure. It should be pointed out that for ordinary technical personnel in the art, several modifications and improvements can be made without departing from the concept of the present disclosure, all of which fall within the scope of protection of the present disclosure. Therefore, the scope of protection of the present disclosure should be based on the attached claims.

What claimed is:

1. A portable mosquito repellent device, comprising a container and a cover body, wherein an upper portion of the container is provided with an opening, the cover body is configured to seal and cover the opening, the container contained a heating body and repellent agent in thermal contact with the heating body, wherein the repellent agent is loaded onto a tablet, the tablet is arranged on the heating body, or the repellent agent is mixed with the heating body to form a heating body mixture;

a composition of the heating body includes reduced iron powder, and a heating temperature of the heating body is 40° C.-120° C., the repellent agent includes Picaridin, wherein the container is provided with a layer of polymer mesh with a porous structure, which prevents the heating body and a tablet from leaking out of the container, and preparation material of the polymer mesh includes one or more of Polyethylene Terephthalate (PET), Poly Tetra Fluoroethylene (PTFE), and expanded PTFE (e-PTFE).

2. The portable mosquito repellent device of claim 1, wherein the repellent agent also includes one or more of mosquito repellent ester, methyl nonyl ketone, and mosquito repellent amine.

3. The portable mosquito repellent device of claim 1, wherein an outer periphery side of the container is uniformly distributed with three or more hooks.

4. The portable mosquito repellent device of claim 1, wherein the cover body covers the opening at one time by hot pressing or thermoplastic means.

5. The portable mosquito repellent device of claim 1, wherein a preparation method of the heating body mixture comprises:

dissolving the repellent agent in an organic solvent to prepare a repellent solution;

adding β-cyclodextrin powder to distilled water to prepare a saturated solution of β-cyclodextrin;

mixing the repellent solution with the saturated solution of β-cyclodextrin and filter to obtain a filter cake;

dispersing the filter cake into a powder-shaped inclusion complex of the β-cyclodextrin and the repellent agent; and mixing the inclusion complex of the β-cyclodextrin and the repellent agent with the heating body to form the heating body mixture.

6. The portable mosquito repellent device of claim 5, wherein the organic solvent is anhydrous ethanol, acetone, or a mixture thereof.

* * * * *